United States Patent
Youssef et al.

(10) Patent No.: US 9,287,921 B2
(45) Date of Patent: Mar. 15, 2016

(54) METHOD AND APPARATUS FOR FRAME SYNCHRONIZATION IN A POSITIONING SYSTEM

(71) Applicant: Samsung Electronics Co., Ltd., Gyeonggi-do (KR)

(72) Inventors: Mohamed Youssef, Marion, IA (US); Bruce McCullough, Robins, IA (US); Steven Gronemeyer, Cedar Rapids, IA (US)

(73) Assignee: Samsung Electronics Co., Ltd (KR)

( * ) Notice: Subject to any disclaimer, the term of this patent is extended or adjusted under 35 U.S.C. 154(b) by 22 days.

(21) Appl. No.: 14/457,497

(22) Filed: Aug. 12, 2014

(65) Prior Publication Data

US 2015/0124856 A1 May 7, 2015

Related U.S. Application Data (60) Provisional application No. 61/899,596, filed on Nov. 4, 2013.

(51) Int. Cl.
| | |
|---|---|
| *H04B 1/00* | (2006.01) |
| *H04B 1/7073* | (2011.01) |
| *G01S 19/13* | (2010.01) |
| *G01S 19/24* | (2010.01) |
| *H04B 1/7075* | (2011.01) |

(52) U.S. Cl.
CPC .............. *H04B 1/7073* (2013.01); *G01S 19/13* (2013.01); *G01S 19/243* (2013.01); *H04B 1/70755* (2013.01); *H04B 2201/70715* (2013.01)

(58) Field of Classification Search
CPC ..................................................... H04B 1/7073
USPC .......................................................... 375/145
See application file for complete search history.

(56) References Cited

U.S. PATENT DOCUMENTS

| | | |
|---|---|---|
| 2003/0193970 A1 | 10/2003 | Kim et al. |
| 2007/0135079 A1 | 6/2007 | Bromley |
| 2010/0226463 A1 | 9/2010 | Wang et al. |
| 2011/0007858 A1 | 1/2011 | Guerrieri et al. |
| 2011/0200058 A1 | 8/2011 | Mushkin et al. |
| 2012/0293369 A1 | 11/2012 | Liu et al. |

FOREIGN PATENT DOCUMENTS

| | | |
|---|---|---|
| JP | 04-127627 | 4/1992 |
| JP | 2011-055443 | 3/2011 |

OTHER PUBLICATIONS

Written Opinion dated Jun. 24, 2015 issued in counterpart Application No. PCT/IB2014/002987, 7 pages.

*Primary Examiner* — Lihong Yu
(74) *Attorney, Agent, or Firm* — The Farrell Law Firm, P.C.

(57) ABSTRACT

A method for soft frame synchronization in a navigational receiver is provided. A distance between bits of a sync pattern received by the navigational receiver and a known sync pattern is computed. A probability of detection value for the received sync pattern based on the distance is assigned. A confidence level for the received sync pattern using the probability of detection value is computed. The confidence level is compared with a confidence threshold. If the confidence level is greater than or equal to the confidence threshold, the confidence level of the received sync pattern is updated to generate a credibility of the sync pattern. The credibility of the received sync pattern is compared with a predetermined credibility value and, if the credibility of the received sync pattern is greater than or equal to the predetermined credibility value, synchronization of the navigational receiver is performed using the received sync pattern.

17 Claims, 7 Drawing Sheets

METHOD AND APPARATUS FOR FRAME SYNCHRONIZATION IN A POSITIONING SYSTEM

PRIORITY

This application claims priority under 35 U.S.C. §119(e) to U.S. Provisional Patent Application Ser. No. 61/899,596, which was filed on Nov. 4, 2013, the entire disclosure of which is incorporated herein by reference.

BACKGROUND OF THE INVENTION

1. Field of the Invention

The present invention relates generally to a method and apparatus for frame synchronization in a positioning or an assisted positioning system and, more specifically, to a Global Navigational Satellite System (GNSS) receiver that uses soft frame synchronization for synchronizing to data or pilot frames in a satellite positioning system.

2. Description of the Related Art

GNSS receivers that are configured to acquire, extract, down-convert and demodulate streamed GNSS navigation signals, which may include information such as almanac/ephemeris parameters, a synchronous code, a time tag, satellite clock corrections, atmospheric models/corrections, and other information that is necessary for position/velocity/time (PVT) determination by the GNSS receiver, are known.

In order to determine the PVT, such GNSS receivers need to acquire and lock onto at least four (4) GNSS navigational signals being streamed from four (4) GNSS satellites. Once the satellites are acquired, the GNSS receiver can download the individual navigational signals, which are modulated with navigational data at various bit rates, e.g., 50 bits/second (i.e. 1 bit/20 msec), 250 bits/second, etc. The navigational data is provided on frames (or on sub-frames).

To demodulate the navigational data carried on the frames, it is necessary to determine a phase of a leading edge of each frame (or sub-frame), that is, to determine the boundary of the frame. Determination of the frame boundary (i.e. the leading edge) is referred to as "frame synchronization," which is critical in order for the GNSS receiver to effectively set the GNSS receiver time and download and extract the navigational data from the satellite.

Frame synchronization uses the first word of the frame (sometimes referred to as the preamble), which is assigned a specific bit pattern. The bit pattern of the preamble may vary depending on the specific GNSS. For example, the Galileo GNSS uses a navigation message that has a preamble, e.g., sync pattern, including a 10 bit configuration, while the Global Positioning System (GPS) and regional Satellite-Based Augmentation Systems (SBASs), such as the Wide Area Augmentation System (WAAS), European Geostationary Navigation Overlay Service (EGNOS), GPS Aided Geo Augmented Navigation (GAGAN), may use other bit configurations.

Performing frame synchronization using the bits of the preamble is not a perfect science, for various anomalies can occur during the frame synchronization process. For example, because the streamed navigational data on the frames is not always received by the GNSS receiver with continuous complete errorless frames, optimizing the frame synchronization task is complicated by the presence of bit errors, slippage (undetected bit(s)), and random data sequences.

To optimize the frame synchronization task, conventional GNSS receivers may correlate the bit patterns of the preamble with possible hypotheses to determine the frame boundary. Such a correlation computation load or process, however, is quite heavy, and typically requires hardware such as correlators, buffers, processors, etc., which can be quite expensive. Additionally, since the most possible hypotheses are sieved from the correlation results, the sieved hypotheses are usually verified by further signal processing such as Viterbi decoding, Cyclic Redundancy Check (CRC), etc. Such signal processing schemes are very complex and take a long period of time to process.

Accordingly, it is desirable to reduce the computation complexity when carrying out the frame synchronization process. There is a need, therefore, to provide an implementable GNSS receiver system that is operable to rapidly perform accurate frame synchronization.

SUMMARY OF THE INVENTION

The present invention has been made to address the above problems and disadvantages, and to provide at least the advantages described below. Accordingly, an aspect of the present invention is to provide a GNSS receiver that uses soft frame synchronization for synchronizing to data frames in a satellite positioning system which may prove useful in the satellite navigation field.

According to an aspect of the present invention, a method for soft frame synchronization in a GNSS receiver is provided. A distance between bits of a sync pattern received by the GNSS receiver and a known sync pattern is computed. A probability of detection value for the received sync pattern based on the distance is assigned. A confidence level for the received sync pattern using the probability of detection value is computed. The confidence level is compared with a confidence threshold. If the confidence level is greater than the confidence threshold, the confidence level of the received sync pattern is updated to generate a credibility of the sync pattern. The credibility of the received sync pattern is compared with a predetermined credibility value and, if the credibility of the received sync pattern is greater than the predetermined credibility value, synchronization of the GNSS receiver is performed using the received sync pattern.

According to another aspect of the present invention, a GNSS receiver is provided. The GNSS receiver includes a radio frequency front end for receiving GNSS satellite signals. The GNSS receiver includes one or more processors that include one or more synchronization modules used for acquiring and tracking the GNSS satellite signals. The synchronization module includes one or more control algorithms that are programmed to compute a distance between bits of a sync pattern received by the GNSS receiver and a known sync pattern. The control algorithm is programmed to assign a probability of detection value for the received sync pattern based on the distance. The control algorithm is programmed to compute a confidence level for the received sync pattern using the probability of detection value and compare the confidence level with a confidence threshold. If the confidence level is greater than the confidence threshold, the control algorithm updates the confidence level of the received sync pattern to generate a credibility of the sync pattern. The control algorithm is programmed to compare the credibility of the received sync pattern with a predetermined credibility value and, if the credibility of the received sync pattern is greater than the predetermined credibility value, perform synchronization of the GNSS receiver using the received sync pattern.

According to another aspect of the present invention, a non-transitory computer readable medium storing a program causing a computer to execute a soft frame synchronization process in a GNSS receiver is provided. In accordance with the soft frame synchronization process, a distance between bits of a sync pattern received by the GNSS receiver and a known sync pattern is computed. A probability of detection value for the received sync pattern based on the distance is assigned. A confidence level for the received sync pattern using the probability of detection value is computed. The confidence level is compared with a confidence threshold. If the confidence level is greater than the confidence threshold, the confidence level of the received sync pattern is updated to generate a credibility of the sync pattern. The credibility of the received sync pattern is compared with a predetermined credibility value and, if the credibility of the received sync pattern is greater than the predetermined credibility value, synchronization of the GNSS receiver is performed using the received sync pattern.

BRIEF DESCRIPTION OF THE DRAWINGS

The above and other aspects, features, and advantages of certain embodiments of the present invention will be more apparent from the following detailed description taken in conjunction with the accompanying drawings, in which.

DETAILED DESCRIPTION OF EMBODIMENTS OF THE PRESENT INVENTION

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

The term "GNSS," as used herein, covers any type of navigational satellite system, global, regional, augmented or otherwise, unless expressly indicated otherwise.

The term "GNSS receiver" as used herein, may be implemented in a mobile terminal, a tablet computer, a camera, a portable music player, and a myriad of other portable and/or mobile personal consumer devices, as well as integrated into larger devices and/or systems, such as the electronics of a vehicle.

As indicated above, a GNSS receiver that uses soft frame synchronization for synchronizing to data frames in a satellite positioning system may prove useful in the satellite navigation field, and such a GNSS receiver is described herein.

Specifically, a GNSS receiver, according to an embodiment of the present invention, uses soft decision levels to establish probabilities of detection for candidate sync patterns. These probabilities are updated once a subsequent (time aligned) sync pattern is detected (i.e. a joint probability is calculated), and a number of successful detections and missed or faulty detections, which are counted as the joint probabilities are being calculated, are used to establish a confidence level (or credibility) that a correct sync pattern has been successfully detected.

Figure 1:
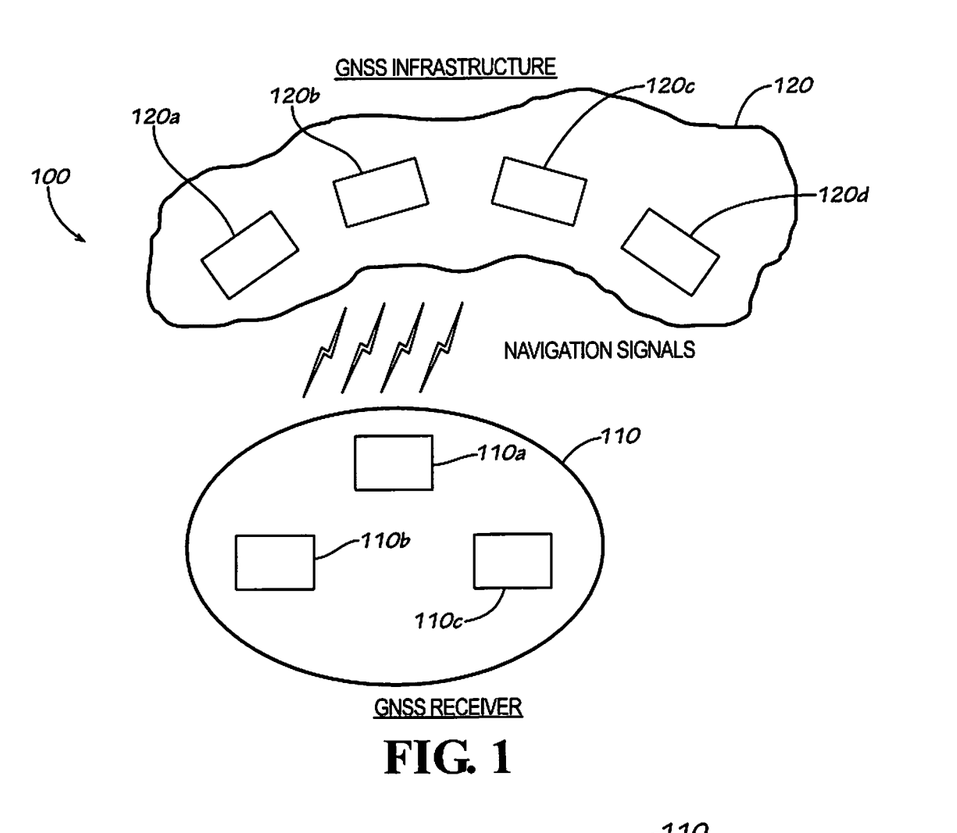
FIG. 1 is a diagram illustrating a GNSS infrastructure that includes a GNSS receiver which uses a soft frame synchronization process according to an embodiment of the present invention.

FIG. 1 is a diagram illustrating a communication system 100 that includes a GNSS infrastructure 120 and a GNSS receiver 110 in accordance with an embodiment of the present invention. For illustrative purposes, the GNSS infrastructure 110 is assumed to be the Galileo GNSS, which is shown including a plurality of satellites 120a through 120d.

The communication system 100 includes a plurality of GNSS receivers 110 which may be implemented in a mobile phone 110a, a tablet computer 110b, a mobile terminal 110c, and/or the portable and/or mobile personal consumer devices described above. Depending on the implementation of the GNSS receiver 110, the GNSS receiver 100 can be hardware based, software based or combination of hardware and software. The GNSS receiver 110 may include suitable logic, circuitry, interfaces and/or code that may be operable to receive GNSS navigational signals broadcast from one of the GNSS satellites 120a-120d that are visible.

Figure 2:
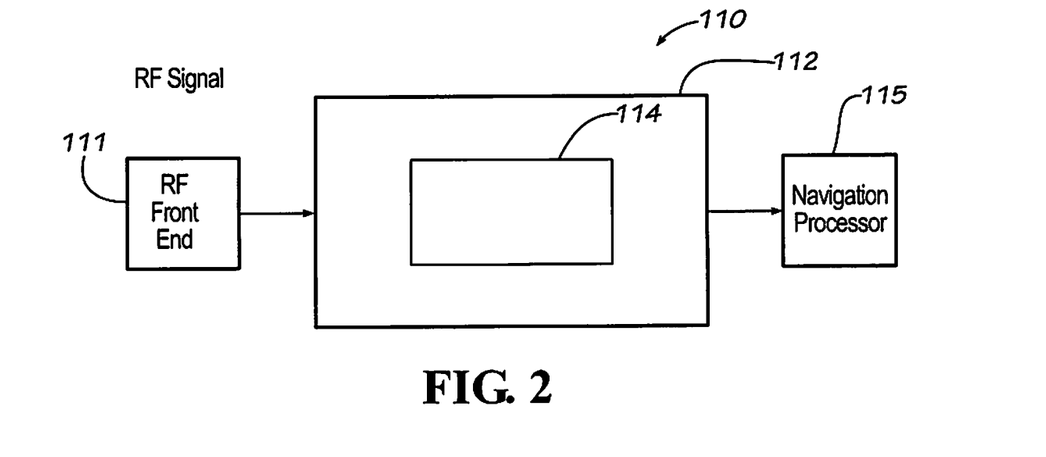
FIG. 2 is a block diagram of the GNSS receiver shown in FIG. 1, according to an embodiment of the present invention.

FIG. 2 illustrates the pertinent components of the GNSS receiver 110. The GNSS receiver 110 includes a radio frequency ("RF") front end 111 which is configured to receive, through channels (not shown), the navigational signals, e.g., RF signals, broadcast from the GNSS satellites 120a-120d. The navigational signals, which include Coarse Acquisition (C/A) Pseudorandom Noise (PRN) code and a navigation data that is superimposed on the C/A PRN code for each of the satellites, may be collected, down-converted, sampled, and amplified by the front end 111.

After the navigational signal is processed by the front end 111, it is sent to a processor 112 for further processing. The front end 111 may communicate the navigational signal to the processor 112 over a wired interface or over a network. The processor 112 is configured to detect (acquire) and track the unique signals (e.g., data and/or pilot signals). The processor 112 also demodulates the navigational signals for extracting navigational data associated with each of the GNSS satellites 120a-120d.

The navigational data extracted by the processor 112 is sent to a navigation processor 115 that calculates a PVT solution (often referred to as position "fix"). The processor 112 may communicate the extracted navigational data to the processor 112 over a wired interface or over a network. Once the PVT solution is known, the navigation processor 115 sends the PVT information to the rest of a larger system (e.g., GNSS receiver 110a) in which the GNSS receiver 110 may be operating.

Other components of the GNSS receiver 110 may include, but are not limited to, one or more counters, an GNSS oscillator, an RTC clock, an DSP, and/or a demodulator.

Continuing with reference to FIG. 2, the processor 112 also includes a synchronization module 114 that embodies one or more synchronization control algorithms, which are configured to perform soft frame synchronization on the pilot signal received from the GNSS satellites 120a-120d, thereby allowing the processor 112 to sync to the pilot signal and demodulate the navigational signal and extract the navigational data carried on a frame of the navigational signal, as will be described below.

In the embodiments, the module 114 and the navigation processor 115 may be omitted, and the processor 112 can be configured to perform the functions of the module 114 and the navigation processor 115.

Figure 3:
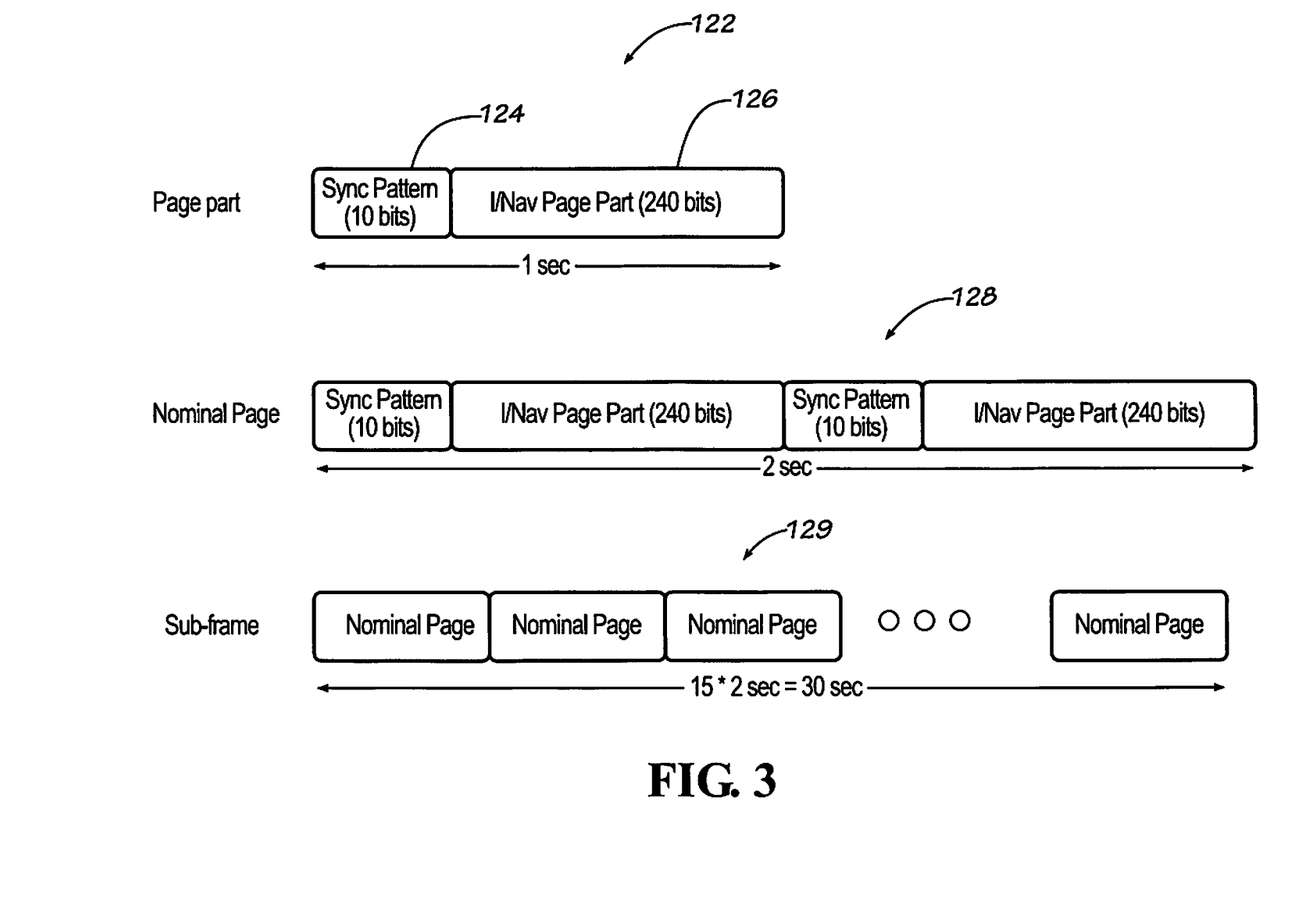
FIG. 3 is a schematic view illustrating an example of a Galileo I/Navigation (Nav) frame synchronization pattern structure.

FIG. 3 illustrates an example of a frame, e.g., an I/Nav message, carried on a navigational signal broadcast from the Galileo satellites 120a-120d of the Galileo GNSS. The I/Nav message (hereinafter "page part 122") can be superimposed on the C/A PRN code broadcast from the Galileo satellites 120a-120d. The page part 122 has a one (1) second transmission length and includes a preamble 124 (referred to as a sync pattern) that is 10 bits long and a data or payload portion 126 (referred to as I/Nav Page Part) that is 240 bits long; the I/Nav stands for navigational data. More data bits can be used from the I/Nav such as week number, reserved bits, etc. The data portion 126 carries the data content, e.g., almanac, ephemeris, satellite clock correction parameters, satellite health data, etc., of the page part 122. The preamble 124 carries a predetermined sync pattern that is utilized by the GNSS receiver 110 for time/frame synchronization and/or for channel estimation with the Galileo satellites 120a-120d.

In accordance with the Galileo system, two (2) page parts 122 form a nominal page 128 that has a transmission length of two (2) seconds, and a sub-frame 129 is fifteen (15) page parts and has a transmission length of 30 seconds, i.e., 15×2 s=30 s.

The module 114 of the GNSS receiver 112 performs soft frame synchronization for synchronizing to the received page part 122 broadcast by the GNSS satellites 120a-120d of the Galileo GNSS. Specifically, the module 114 computes a probability of detection (Pd) for each bit sequence of the sync pattern of the preamble 124. The Pd is computed based on finding the distance/difference between a received bit sequence (RBS) that has been soft-quantized (SQ) (e.g., RBS=0 1 0 1 1 0 0 0 0 0→SQ=8 7 15 0 30 24) and a most confident sync pattern, which is a known parameter of the Galileo system.

Through empirical testing, it is has been found that calculating the Pd in such a manner allows the module 114 to detect candidate sync patterns received from the GNSS satellites 120a-120d at various signal to noise ratios (SNRs).

Figure 4A:
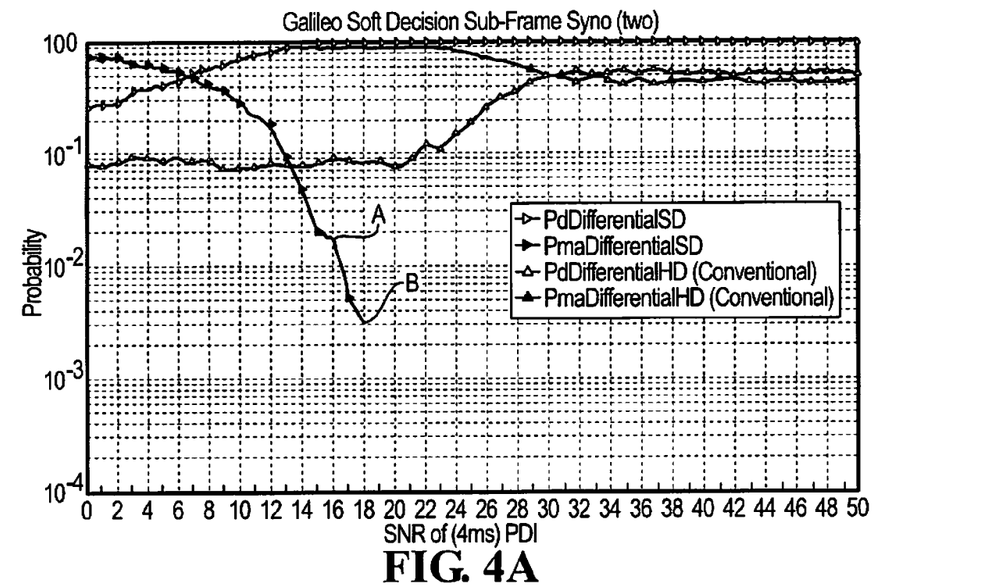
FIGS. 4A and 4B are graphs illustrating results of Galileo simulations for soft-weak frame synchronization performed on two and three sub-frames, respectively, according to embodiments of the present invention.
Figure 4B:
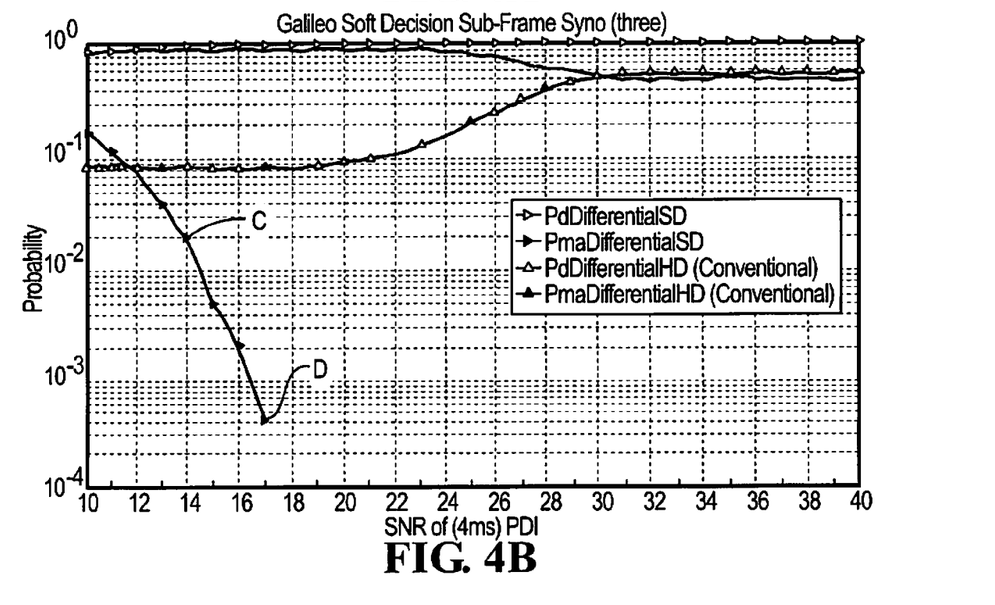

FIGS. 4A and 4B illustrate the results of Galileo simulations for two- and three-bit sub-frames.

More specifically, FIG. 4A shows a soft bit frame synchronization process that has been performed on two (2) sub-frames. For two (2) sub-frames, a Pd can be obtained at a SNR approximately equal to 16 dBHz (point A in FIG. 4A). It is noted that the results of the simulation illustrated in FIG. 4A also show that the soft bit frame synchronization process for two (2) sub-frames has a probability of false alarm (Pfa) approximately equal to $10^{-3}$ at a SNR approximately equal to 19 dBHz (point B).

In accordance with the present invention, it has been found that by increasing the number of sub-frames in which the soft bit frame synchronization process is performed, the Pfa can be maintained, even when the Pd is achieved at relatively low DBHz values. For example, FIG. 4B shows a soft bit frame synchronization process that has been performed on three (3) sub-frames. For three (3) sub-frames, the Pd can be obtained at a SNR approximately equal to 14 dBHz (point C in FIG. 4B). It is noted, that the results of the simulation illustrated in FIG. 4B show that the frame synchronization process for three (3) sub-frames has a Pfa approximately equal to $10^{-4}$ at a SNR approximately equal to 18 dBHz (at point D).

From the graphs illustrated in FIGS. 4A-5B, it can be concluded that a Pd for a candidate sync pattern, based on finding the distance/difference between an RBS that has been soft-quantized and a most confident sync pattern, can be obtained at relatively low SNRs, while minimizing a Pfa.

Figure 5:
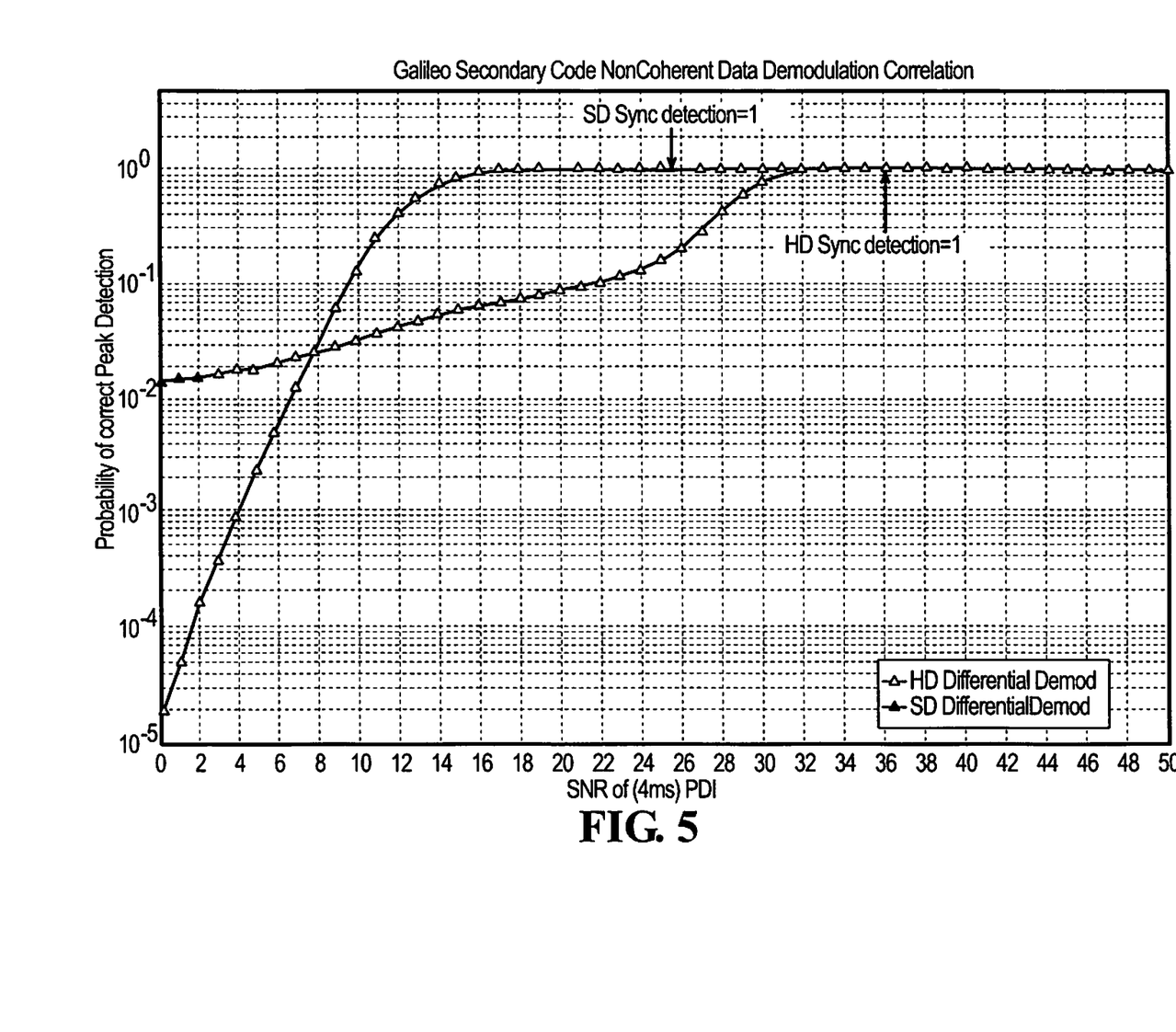
FIG. 5 is a graph illustrating results of Galileo simulations for Secondary Code NonCoherent Data Demodulation Correlation, according to an embodiment of the present invention.

FIG. 5 is a graph of Galileo E1-C Secondary Code Non-Coherent Data Demodulation Correlation. Unlike the graphs illustrated in FIGS. 4A-5B, the graph of FIG. 5 shows the results of a soft bit frame synchronization process performed on a received pilot signal that is correlated separately with pilot and sync pattern local replicas (e.g., noncoherent combining).

As illustrated from the graph of FIG. 5, a probability of detection (Pd) of such a signal can be obtained at smaller SNRs using the soft bit frame synchronization process (e.g., soft decision (SD) decoding) of the present invention when compared to conventional hard decision (HD) decoding processes. As evidenced from the graph of FIG. 5, with SD decoding, the Pd can be obtained at a SNR approximately equal to 26 dBHz, while with HD decoding, the Pd can be obtained at a SNR approximately equal to 36 dBHz.

From the graph of FIG. 5, it can be concluded that a Pd for a candidate sync pattern, based on finding the distance/difference between an RBS that has been soft-quantized and a most confident sync pattern, can be obtained at relatively low SNRs, when compared to conventional hard decision (HD) decoding processes.

Figure 6:
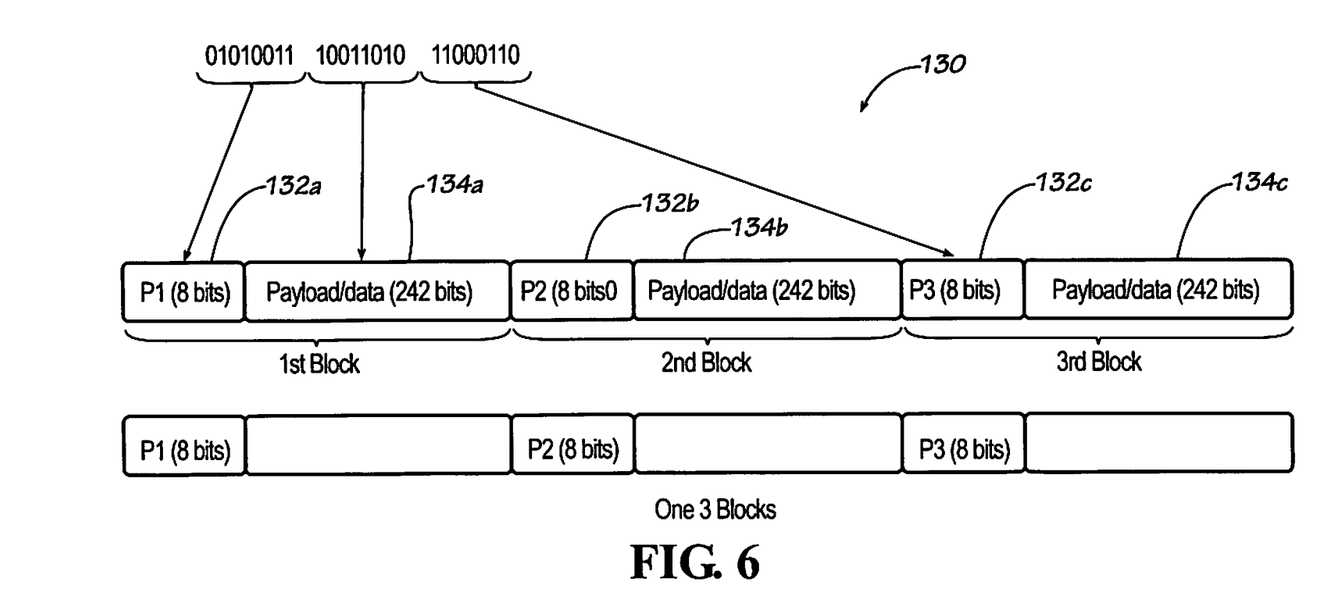
FIG. 6 is a schematic view illustrating an example of a Satellite-Based Augmentation System (SBAS) frame synchronization pattern structure.

In accordance with the present invention, the GNSS receiver 110 may be implemented with other satellite based augmented systems, such as, for example, SBAS, which may use a frame synchronization pattern structure 130 (e.g., page part 130) shown in FIG. 6.

Unlike the Galileo I/Nav page part 122, the SBAS page part 130 includes a distributed preamble that is a twenty-four (24) bit word distributed over three (3) successive blocks 132a-132c. In the illustrated embodiment, block 132a includes the bit sequence 01010011, block 132b includes the bit sequence 10011010, and the block 132c includes the bit sequence 11000110. The page part 130 also includes three 242 bit data or payload parts 134a-134c and includes a threshold of 32 dBHz.

The module 114 can be configured to perform a soft bit frame synchronization process similar to the one described above with respect the page part 122 on the page part 130 of the SBAS. In this embodiment, however, the module 114 performs the soft bit frame synchronization process for each bit of every twenty four (24) bit word for each of the three (3) blocks 132a-132c.

Figure 7A:
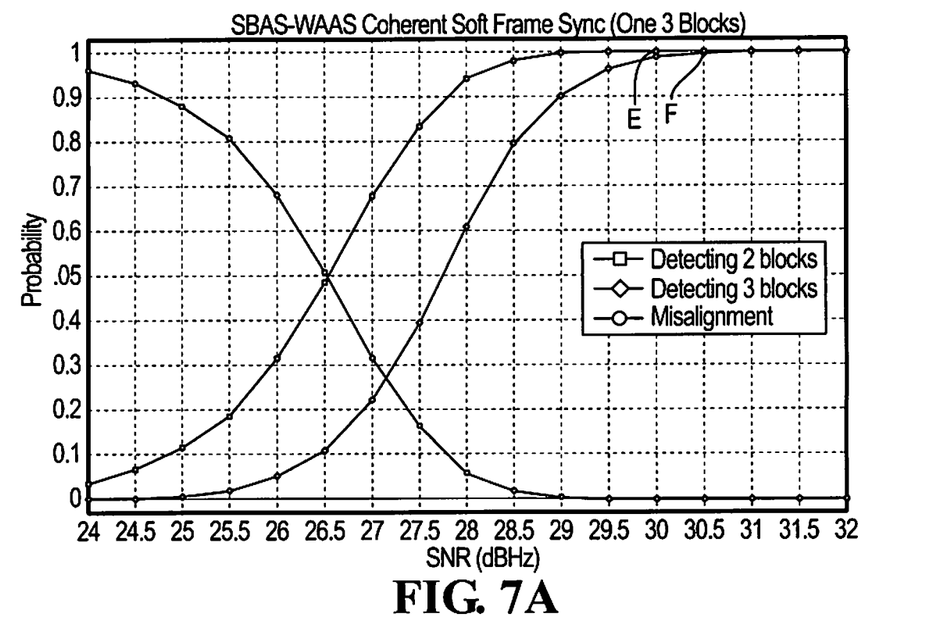
FIGS. 7A-7B are graphs illustrating results of simulations of the SBAS frame synchronization pattern structure shown in FIG. 7, according to an embodiment of the present invention.
Figure 7B:
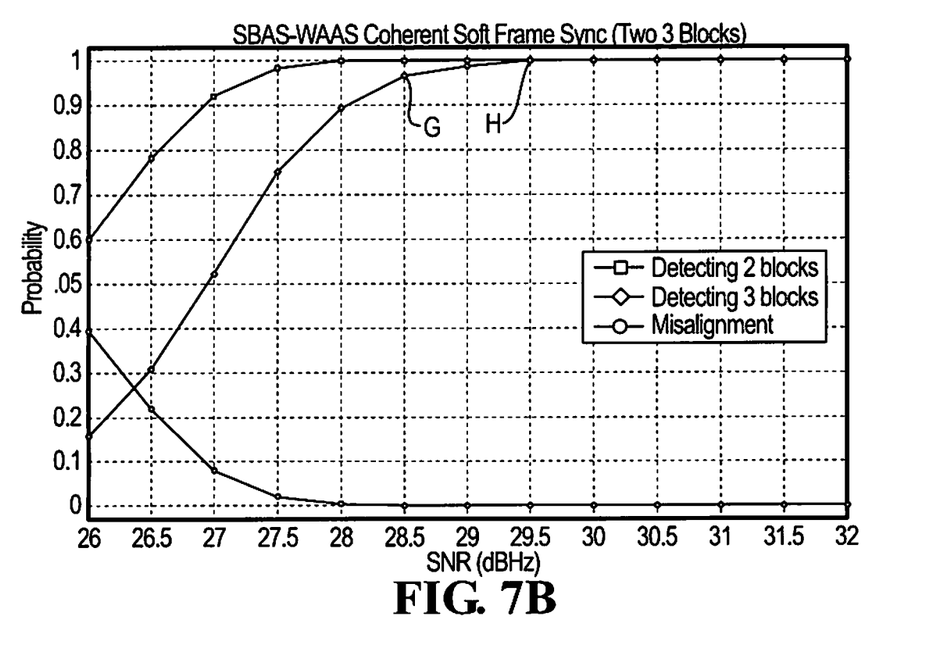

FIGS. 7A-7B shows the results of simulations of the SBAS frame synchronization pattern structure in accordance with an embodiment of the present invention.

FIG. 7A shows a soft bit frame synchronization process performed on one (1) three (3) block page part 130. As shown in FIG. 7A, a Pd can be obtained at a SNR approximately equal to 29.5 dBHz (at point E) when the SD is performed on all three (3) blocks, while a Pd can be obtained at a SNR approximately equal to 30.5 dBHz (at point F) when the SD is performed on two (2) of the three (3) blocks. Likewise, for two (2) three (3) block page parts 130, a Pd can be obtained at a SNR approximately equal to 28.5 dBHz (at point G in FIG. 7B) when the SD is performed on all three (3) blocks of each of the two (2) page parts 130, while a Pd can be obtained at a SNR approximately equal to 29.5 dBHz (at point H) when the SD is performed on two (2) of the three (3) blocks of each of the two (2) page parts 130.

From the graphs illustrated in FIGS. 7A-7B, it can be concluded that a Pd for a candidate sync pattern, based on finding the distance/difference between an RBS that has been soft-quantized and a most confident sync pattern, can be obtained at relatively low SNRs, while minimizing a probability of BER.

Figure 8:
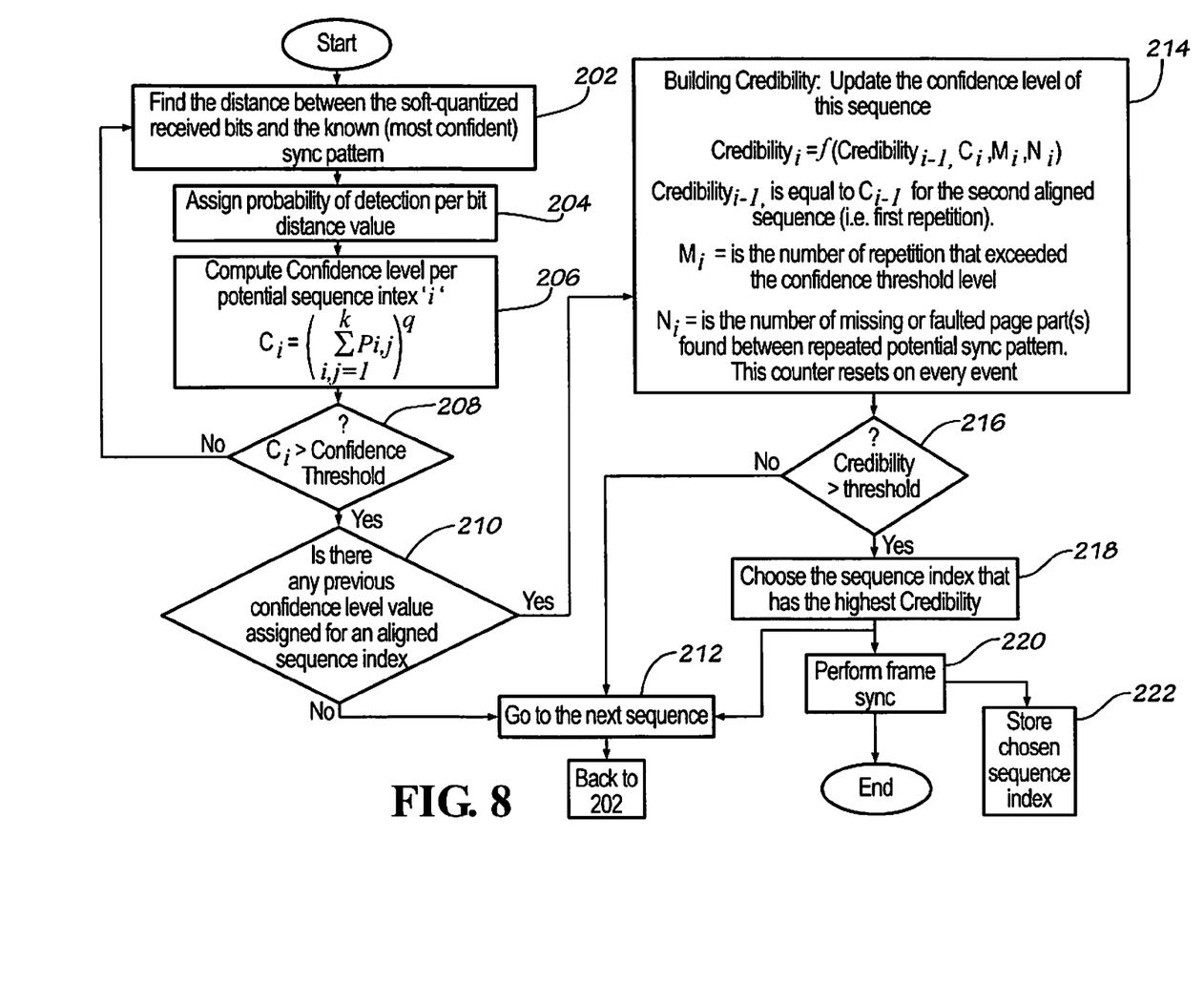
FIG. 8 is a flowchart illustrating a soft decision frame synchronization method, according to an embodiment of the present invention.

FIG. 8 is a flowchart illustrating a soft decision frame synchronization method that can be used for frame synchronization, according to an embodiment of the present invention. For illustrative purposes, it is assumed that the receiver 110 is receiving a sync pattern within the received signal from a Galileo satellite, e.g., GNSS satellite 120.

After the RF signal transmitted from GNSS satellite 120 is processed by the RF front end 111, it is sent to the module 114 for frame synchronization.

At step 202, a distance between each bit of a received sync pattern (the bits of which having already been soft-quantized via the module 114, e.g., RBS=0 1 0 1 1 0 0 0 0 0→SQ=8 7 15 0 30 24) and bits of a known (e.g., most confident) sync pattern is calculated. The bits of the known sync pattern are a parameter of the Galileo navigation system and are stored in a memory of the GNSS receiver 110 for access by the module 114.

At step 204, once the distance is calculated for each bit, the module 114 assigns a probability of detection based on the per bit distance value.

Thereafter, at step 206 a confidence level (e.g., a joint probability) per potential sequence index "i" is calculated using the following Equation (1):

$$C_i = \left( \sum_{i,j=1}^{k} p_{i,j} \right)^q . \quad (1)$$

In Equation (1), $p_{i,j}$ equals the probability of detection per bit distance value, $C_i$ equals the confidence level, and 10 equals the number of bits. In Equation (1), the power two (2) is used for illustrative purposes, and $C_i$ can be determined to the $n^{th}$ power.

At step 208, if the calculated $C_i$ is less than a confidence threshold, then the process returns to step 202 and starts from the beginning. If, however, the calculated $C_i$ is greater than or equal to the confidence threshold, then the synchronization control algorithm checks for any previous confidence level values assigned for an aligned sequence index at step 210. If there are no confidence level values assigned, then the synchronization control algorithm goes to the next sequence at step 212; it is noted, for a first sequence there will be no confidence level values assigned. If there are confidence level values assigned, then the synchronization control algorithm updates the confidence level of the received sync pattern at step 214 according to the following Equation (2):

$$\text{Credibility}_i = f(\text{Credibility}_{i-1}, C_i, M_i, N_i) \quad (2)$$

In Equation (2), Credibilty$_{i-1}$ is equal to $C_{i-1}$ for a second aligned sequence repetition, $M_i$ is equal to the number of repetitions that exceeded the confidence threshold level ($M_i$ is counted via a counter (not shown) that resets for every sync pattern), $N_i$ is equal to the number of missing or faulty page part(s) found between repeated potential sync patterns ($N_i$ is counted via a counter (not shown) that also resets for every sync pattern), a gain factor, and a diminishing factor may be associated with $M_i$ and $N_i$.

In accordance with the present invention, using the two factors $M_i$ and $N_i$ in Equation (2) and multiplying the factors $M_i$ and $N_i$ by the respective gain factor g and diminishing factor l, reduces the probability of misalignment between the received sync pattern and the known sync pattern.

In the embodiments of the present invention, other equations may also be used to update the confidence level of the received sync pattern.

The gain factor can be a predetermined parameter of the synchronization algorithm, or it can be calculated in real time and based on variables, such as how many sub-frames were detected, how many consecutive bits were detected, etc. Similarly, the diminishing factor can be a predetermined parameter of the synchronization algorithm, or it can be calculated in real time and based on variables, such as how many consecutive bits were not detected between consecutive bit detections. For example, three (3) consecutive bits of the sync pattern are detected, then four bits are not detected and then three (3) consecutive bits are detected.

At step 216, if the updated credibility is less than a predetermined value, e.g., less than 1, the synchronization control algorithm goes to the next sync pattern at step 212 and the counters reset.

If, however, the updated credibility is greater than the predetermined value 1 at step 216, then the module 114 chooses this received sync pattern as the candidate sync pattern, i.e., sync pattern which has the highest credibility, at step 218 and then completes the frame synchronization process at step 220.

At step 222, the module 114 stores the chosen sync pattern in a memory of the GNSS receiver 110 for future use, as described below.

Once the frame synchronization process is complete, the processor 112 can demodulate the received navigation signal and extract the navigation data from the data portion 126 of the page part 122. Thereafter, the processor 112 sends the navigation data to the navigation processor 115 which calculates the (PVT) solution and sends this information to the rest of a larger system in which the receiver 110 may be operating.

In accordance with the present invention, the GNSS receiver 110 performs rapid and accurate frame synchronization on the pilot signals broadcast from the GNSS satellites 120a-120d.

Moreover, unlike conventional GNSS receivers, the GNSS receiver 110 is able to perform frame synchronization on received navigation signals well past a reasonable carrier-to-noise ratio ($C/N_O$), as evidenced from the graphs described above relating to SNR.

Further, during the aforementioned frame synchronization process or after a completed frame synchronization process, if there is an abrupt/frequent drop(s) in $C/N_O$, the module 114 can bypass the aforementioned frame synchronization process and simply retrieve and use the sync pattern, i.e., the sync pattern with the highest credibility, previously stored in memory (see step 214) to reestablish acquisition with the GNSS satellite.

Additionally, since the synchronization module 114 only uses the sync pattern portion of the navigation signal to perform the aforementioned Pd calculations, there is no need to save data during the aforementioned frame synchronization process. As can be appreciated, adding such a step would increase the overall time of the synchronization process.

While the embodiments discussed herein focus on the Galileo system, the embodiments discussed herein can also be used with other GNSS systems, such as, for example, the Global Positioning System (GPS) of the United States, the GLONASS system of Russia, the BEIDOU/COMPASS system of China, the GPS And Geo-Augmented Navigation (GAGAN) of India, or other GNSS systems not herein described.

Moreover, while the embodiments discussed herein focus on GNSS signal reception, the technique disclosed herein is generally applicable to other wireless communication situations or standards which feature a repeated synchronization pattern to maintain data frame synchronization. Such wireless communication standards may include IEEE 802.11, IEEE 802.15, IEEE 802.15.1-IEEE 802.15.6, IEEE 802.16, and ISO/IEC 18092.

As noted above, the GNSS receiver 110 can be software based. Therefore, the present invention or aspects thereof are capable of being distributed in the form of a non-transitory computer-readable program product stored in a tangible computer medium and a non-transitory computer-readable medium of instructions in a variety of forms for execution on a processor, processors, or the like, and the present invention applies equally regardless of the particular type of signal-bearing media used to actually carry out the distribution.

The non-transitory computer-readable medium of instructions stores a program causing a computer to execute a soft frame synchronization process in a GNSS receiver, the soft frame synchronization process includes computing a distance between bits of a sync pattern received by the GNSS receiver and a known sync pattern; assigning a probability of detection value for the received sync pattern based on the distance; computing a confidence level for the received sync pattern using the probability of detection value; comparing the confidence level with a confidence threshold; if the confidence level is greater than the confidence threshold, updating the confidence level of the received sync pattern to generate a credibility of the sync pattern; and comparing the credibility of the received sync pattern with a predetermined credibility value and, if the credibility of the received sync pattern is greater than the predetermined credibility value, synchronizing the GNSS receiver using received sync pattern.

The non-transitory computer readable program product can be in the form of microcode, programs, routines, and symbolic languages that provide a specific set or sets of ordered operations that control the functioning of the hardware and direct its operation, as known and understood by those skilled in the art. Examples of computer readable media include, but are not limited to: nonvolatile hard-coded type media such as read only memories (ROMs), CD-ROMs, and DVD-ROMs, or erasable, electrically programmable read only memories (EEPROMs), recordable type media such as floppy disks, hard disk drives, CD-R/RWs, DVD-RAMs. DVD-R/RWs, DVD+R/RWs, flash drives, memory sticks, HD-DVDs, mini disks, laser disks, Blu-ray disks, and other newer types of memories, and transmission type media such as digital and analog communication links.

While the present invention has been particularly shown and described with reference to certain embodiments thereof, it will be understood by those of ordinary skill in the art that various changes in form and details may be made therein without departing from the spirit and scope of the present invention as defined by the following claims and their equivalents.

What is claimed is:

1. A method for soft frame synchronization in a navigational receiver, the method comprising:
   computing a distance between bits of a sync pattern received by the navigational receiver and a known sync pattern;
   assigning a probability of detection value for the received sync pattern based on the distance;
   computing a confidence level for the received sync pattern using the probability of detection value;
   comparing the confidence level with a confidence threshold;
   if the confidence level is greater than or equal to the confidence threshold, updating the confidence level of the received sync pattern to generate a credibility of the sync pattern; and
   comparing the credibility of the received sync pattern with a predetermined credibility value and, if the credibility of the received sync pattern is greater than or equal to the predetermined credibility value, performing synchronization of the navigational receiver using the received sync pattern.

2. The method according to claim 1, wherein computing the distance between the bits of the sync pattern received by the navigational receiver and the known sync pattern further includes soft-quantizing the received bits.

3. The method according to claim 1, wherein comparing the credibility of the received sync pattern with a predetermined credibility value further includes counting a number of repetitions of the received sync pattern that exceeds the confidence threshold.

4. The method according to claim 3, wherein after comparing the credibility of the received sync pattern with a predetermined credibility value, further comprising resetting a counter used to count the number of repetitions of the received sync pattern.

5. The method according to claim 1, wherein comparing the credibility of the received sync pattern with a predetermined credibility value further comprises counting a number of missing or faulty parts found between repeated received sync patterns.

6. The method according to claim 5, wherein after comparing the credibility of the received sync pattern with a predetermined credibility value, further comprising resetting a counter used to count the number of missing or faulty parts found between repeated received sync patterns.

7. The method according to claim 1, wherein comparing the credibility of the received sync pattern with a predetermined credibility value further comprises calculating a first product that is equal to multiplying the number of repetitions of the received sync pattern by a gain factor and calculating a second product that is equal to multiplying the number of missing or faulty parts found between repeated received sync patterns by a diminishing factor.

8. The method according to claim 7, wherein comparing the credibility of the received sync pattern with a predetermined credibility value further comprises subtracting the second product from the first product.

9. The method according to claim 1, wherein computing the confidence level for the received sync pattern is based on a joint probability of the received sync pattern.

10. A Global Navigational Satellite System (GNSS) receiver, comprising:
    a radio frequency front end for receiving satellite signals; and one or more processors including at least one synchronization module including at least one control algorithm programmed to:
- compute a distance between bits of a sync pattern received by the GNSS receiver and a known sync pattern;
- assign a probability of detection value for the received sync pattern based on the distance;
- compute a confidence level for the received sync pattern using the probability of detection value;
- compare the confidence level with a confidence threshold;
- if the confidence level is greater than or equal to the confidence threshold, update the confidence level of the received sync pattern to generate a credibility of the sync pattern; and
- compare the credibility of the received sync pattern with a predetermined credibility value and, if the credibility of the received sync pattern is greater than or equal to the predetermined credibility value, perform synchronization of the GNSS receiver using the received sync pattern.

11. The GNSS receiver according to claim 10, wherein the synchronization module is configured to soft-quantize the received bits.

12. The GNSS receiver according to claim 10, wherein the GNSS receiver includes at least one resettable counter that counts a number of repetitions of the received sync pattern that exceeds the confidence threshold.

13. The GNSS receiver according to claim 12, wherein the GNSS receiver includes at least one resettable counter that counts a number of one of missing or faulty parts found between repeated received sync patterns.

14. The GNSS receiver according to claim 13, wherein the at least one control algorithm is programmed to calculate a first product that is equal to multiplying the number of repetitions of the received sync pattern by a gain factor and calculate a second product that is equal to multiplying the number of missing or faulty parts found between repeated received sync patterns by a diminishing factor.

15. The GNSS receiver according to claim 14, wherein the at least one control algorithm is programmed to subtract the second product from the first product.

16. The GNSS receiver according to claim 10, wherein the at least one control algorithm is programmed to compute the confidence level for the received sync pattern based on a joint probability of the sync pattern.

17. A non-transitory computer readable medium storing a program causing a computer to execute a soft frame synchronization process in a Global Navigational Satellite System (GNSS) receiver, the soft frame synchronization process comprising:
- computing a distance between bits of a sync pattern received by the GNSS receiver and a known sync pattern;
- assigning a probability of detection value for the received sync pattern based on the distance;
- computing a confidence level for the received sync pattern using the probability of detection value;
- comparing the confidence level with a confidence threshold;
- if the confidence level is greater than or equal to the confidence threshold, updating the confidence level of the received sync pattern to generate a credibility of the sync pattern; and
- comparing the credibility of the received sync pattern with a predetermined credibility value and, if the credibility of the received sync pattern is greater than or equal to the predetermined credibility value, performing synchronization of the GNSS receiver using the received sync pattern.

* * * * *